(12) United States Patent
Stueckler et al.

(10) Patent No.: US 9,539,669 B2
(45) Date of Patent: Jan. 10, 2017

(54) METHOD FOR PRODUCING AN ENDLESS BELT

(71) Applicant: Berndorf Band GmbH, Berndorf (AT)

(72) Inventors: Thomas Stueckler, Wimpassing (AT); Richard Szigethi, Neudoerfl (AT)

(73) Assignee: Berndorf Band GmbH, Berndorf (AT)

( * ) Notice: Subject to any disclaimer, the term of this patent is extended or adjusted under 35 U.S.C. 154(b) by 25 days.

(21) Appl. No.: 14/648,272

(22) PCT Filed: Dec. 12, 2013

(86) PCT No.: PCT/AT2013/050247
§ 371 (c)(1),
(2) Date: May 29, 2015

(87) PCT Pub. No.: WO2014/089594
PCT Pub. Date: Jun. 19, 2014

(65) Prior Publication Data
US 2015/0314395 A1  Nov. 5, 2015

(30) Foreign Application Priority Data
Dec. 12, 2012  (AT) .................................. 50577/2012

(51) Int. Cl.
  *B21C 37/00*  (2006.01)
  *B23K 31/02*  (2006.01)
  (Continued)

(52) U.S. Cl.
  CPC ........... *B23K 31/02* (2013.01); *B21C 37/0815* (2013.01); *C22C 38/42* (2013.01); *C22C 38/50* (2013.01);
  (Continued)

(58) Field of Classification Search
  CPC .................................. B21D 53/14; B21D 53/16
  See application file for complete search history.

(56) References Cited

U.S. PATENT DOCUMENTS 3,308,698 A * 3/1967 Brown ................... B21D 53/14
                                                       228/160
3,922,771 A * 12/1975 Beusink ................. B21D 53/14
                                                       228/157
(Continued)

FOREIGN PATENT DOCUMENTS

CN   102120290 A   7/2011
DE   44 32 674 C1  2/1996
(Continued)

OTHER PUBLICATIONS

International Search Report of PCT/AT2013/050247, mailed May 15, 2014.

*Primary Examiner* — Devang R Patel
(74) *Attorney, Agent, or Firm* — Collard & Roe, P.C.

(57) ABSTRACT

The invention relates to a method of producing an endless belt (1) from at least two plate-shaped metal plates (2, 3, 4), and the at least two metal plates (2, 3, 4) are introduced into one of two opposing fixtures of at least one removable connection element (5a, 5b), one edge (9, 10, 11, 12) of each leading, and form a composite board (6), whereupon free end edges (7, 8) of the composite board (6) which lie opposite the edges (9, 10, 11, 12) of the metal plates disposed in the at least one connection element (5) are bent towards one another and welded together, whereupon the at least one connection element (5a, 5b) is removed and the edges (9, 10, 11, 12) of the metal plates (2, 3, 4) connected to one another beforehand by the at least one connection element (5) are bent towards one another and welded together.

3 Claims, 3 Drawing Sheets

Figure 1:
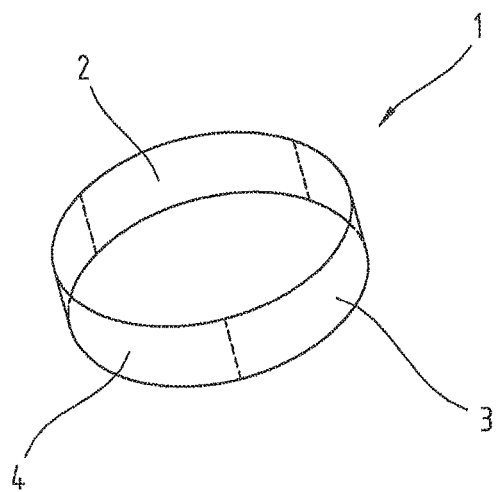

(51) Int. Cl.

| | | |
|---|---|---|
| *C22C 38/50* | (2006.01) | |
| *C22C 38/42* | (2006.01) | |
| *B21C 37/08* | (2006.01) | |
| *F16G 1/20* | (2006.01) | |
| B21D 53/14 | (2006.01) | |
| B21D 53/16 | (2006.01) | |

(52) U.S. Cl.
CPC ................ *F16G 1/20* (2013.01); *B21D 53/14* (2013.01); *B21D 53/16* (2013.01)

(56) References Cited

U.S. PATENT DOCUMENTS

| | | | | |
|---|---|---|---|---|
| 4,878,985 | A * | 11/1989 | Thomsen | B29C 53/40 156/137 |
| 4,968,369 | A * | 11/1990 | Darcy | B29C 53/38 156/217 |
| 5,269,856 | A * | 12/1993 | Igawa | C21D 8/0205 148/609 |
| 6,467,148 | B1 * | 10/2002 | Suzuki | F16G 5/16 148/606 |
| 7,491,281 | B2 * | 2/2009 | Darcy, III | B29C 53/36 156/157 |
| 2002/0104606 | A1 * | 8/2002 | Ohzuru | B32B 27/34 156/140 |

FOREIGN PATENT DOCUMENTS

| | | | |
|---|---|---|---|
| EP | 0 701 878 B1 | 3/1996 | |
| EP | 0701878 A1 * | 3/1996 | ......... B23K 37/0535 |
| EP | 1 632 307 A2 | 3/2006 | |
| GB | 485 242 A | 5/1938 | |
| JP | 57064489 A * | 4/1982 | |

\* cited by examiner

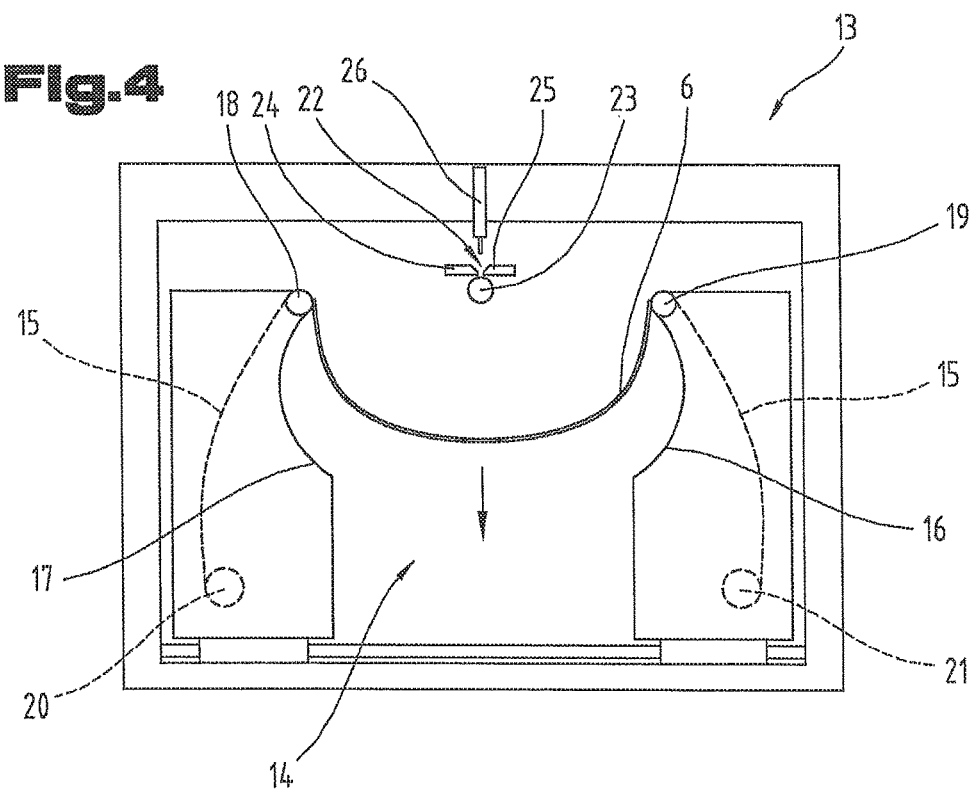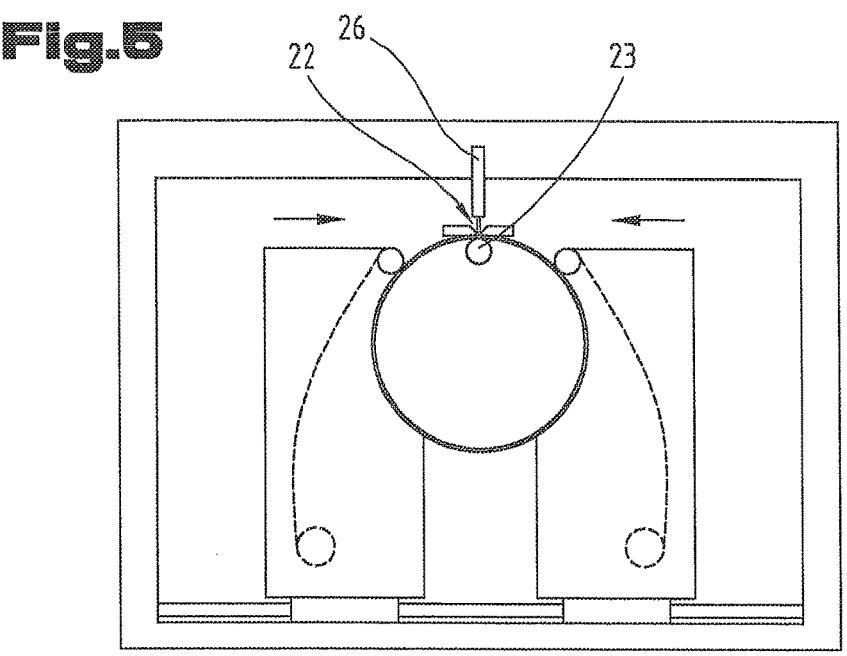

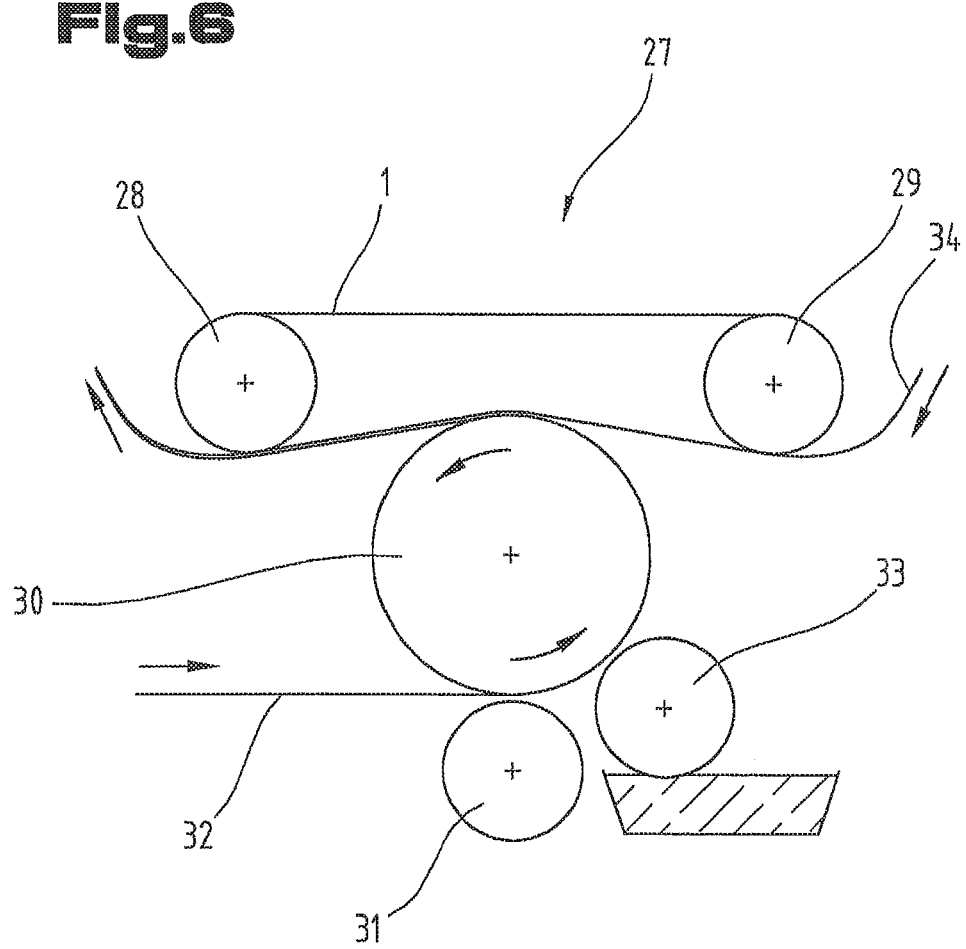

METHOD FOR PRODUCING AN ENDLESS BELT

CROSS REFERENCE TO RELATED APPLICATIONS

This application is the National Stage of PCT/AT2013/050247 filed on Dec. 12, 2013, which claims priority under 35 U.S.C. §119 of Austrian Application No. A 50577/2012 filed on Dec. 12, 2012, the disclosure of which is incorporated by reference. The international application under PCT article 21(2) was not published in English.

The invention relates to a method of producing an endless belt from at least two plate-shaped metal sheets.

The invention further relates to an endless belt.

In addition, the invention relates to a device comprising at least two rollers between which an endless belt circulates.

Small belts in the form of endless belts, for example wheel drive belts such as used on vehicle test rigs or small belts such as used in devices for producing faced corrugated board, are usually produced by bending and welding metal plates. The problem associated with this is that the raw material is often supplied by the manufacturer in the form of metal panels based on a size dictated by the manufacturer of the metal panels, which means that it is often necessary to weld metal panels to one another in order to obtain a desired belt length. To date however, no solution has been found which enables metal plates to be bent and welded on a largely automated basis to form an endless belt, which means that a large number of production steps still have to be performed manually.

In the case of producing tubes from a metal panel or a metal plate, EP0701878 B1 discloses a method whereby metal panels held in a device are bent by means of tensioning belts to produce a tube or ring and the free end edges lying next to one another are welded. The method known from EP0701878 B1 enables tubes to be produced from metal plates on a fully automated basis. A method of the type outlined above is known from EP1632307 A2 whereas GB485242A discloses an endless belt of the relevant type.

To date, however, it has not been possible to produce an endless belt made from two or more metal panels using the known solutions because the known method is only suitable for processing a single metal plate. Accordingly, the objective of the invention is to find a way of overcoming the above-mentioned disadvantage of the prior art.

This objective is achieved by the invention on the basis of a method of the type outlined above, whereby the at least two metal plates are introduced into one of two opposing fixtures of at least one removable connection element with one edge of each leading and form a composite board, whereupon free end edges of the composite board which lie opposite the edges of the metal plates disposed in the at least one connection element are bent towards one another and welded together, whereupon the at least one connection element is removed and the edges of the metal plates connected to one another beforehand by the at least one connection element are bent towards one another and welded together.

By using a connection element, the solution proposed by the invention enables two metal plates to be joined to form a composite board which can then be processed on an automated basis as if it were a single metal plate. One advantage of the invention, therefore, is that it offers a simple way of enabling an endless belt to be produced on an automated basis from several metal plates.

Based on one advantageous embodiment of the invention, the metal plates connected to one another to form the composite board can be formed to an annular shape in a holding device by means of tensioning belts, and the free end edges of the composite board can be clamped in a clamping device and moved towards one another until a gap between the free end edges is closed, after which the free end edges are welded together by means of a welding device. In this connection, the metal plates are advantageously connected to one another by means of the at least one connection element before being placed in the holding device.

The invention lends itself particularly well to producing a three-part endless belt. Based on one variant of the invention in this connection, three metal plates are used to produce the belt, in which case two adjacent metal plates are respectively connected to one another with at least one connection element in each case in order to form a composite board from the three metal plates, the terminal, free end edges of which are bent towards one another and welded together, after which at least a first connection element disposed between a middle metal plate and a first outer metal plate is removed and the edges of the middle metal plate and the first outer metal plate connected to one another beforehand by the at least one first connection element are bent towards one another and welded together, after which at least a second connection element disposed between the middle metal plate and a second outer metal plate is removed and the edges of the middle and second outer metal plates connected to one another beforehand by the at least one second connection element are bent towards one another and welded together.

It is of particular advantage for typical small belt applications if the resultant endless belt comprises three portions connected to one another made from metal plates disposed one after the other in the belt longitudinal direction, and two directly adjacent portions are respectively welded together at mutually adjoining edges of the portions. The special design of the endless belt proposed by the invention offers a simple way of producing small belts from commercially standard, prefabricated metal plates for a variety of applications.

Based on one embodiment of the invention which is particularly well suited for use as a wheel drive belt, for example, or for use in a device for producing faced corrugated board, the endless belt has a circumferential length of between 0.2 m and 10 m, in particular between 1 m and 3 m, a thickness of between 0.1 mm and 1 mm, in particular between 0.2 mm and 0.8 mm and a width of between 0.2 m and 4 m, in particular between 2 m and 3 m.

Particularly good properties in terms of wear-resistance and durability can be achieved if the endless belt is made from a steel comprising 0.09% C, 15.0% Cr, 7.0% Ni, 0.7% Cu and 0.4% Ti. The remaining elements of the steel based on this variant of the invention are provided in the form of Fe.

In the case of many applications, it has proved to be of particular advantage if the belt has a tensile strength of 1200 to 1600 N/mm$^2$.

Based on a preferred embodiment, the belt may have a modulus of elasticity of 190000 to 210000 N/mm$^2$.

The endless belt proposed by the invention is particularly suitable for use in a device having at least two rollers, between which the endless belt circulates. A device of this type might be a device for producing corrugated board faced on at least one side or alternatively a test rig for automobiles.

Figure 2:
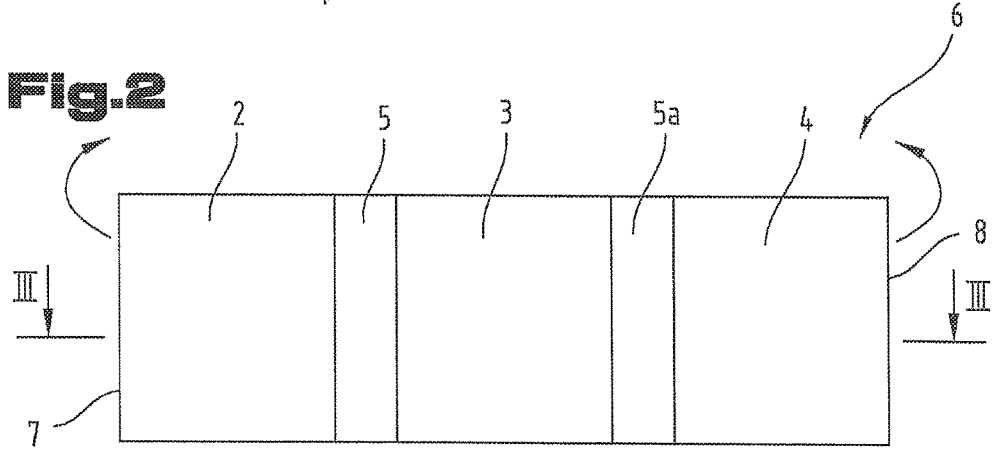
Figure 3:
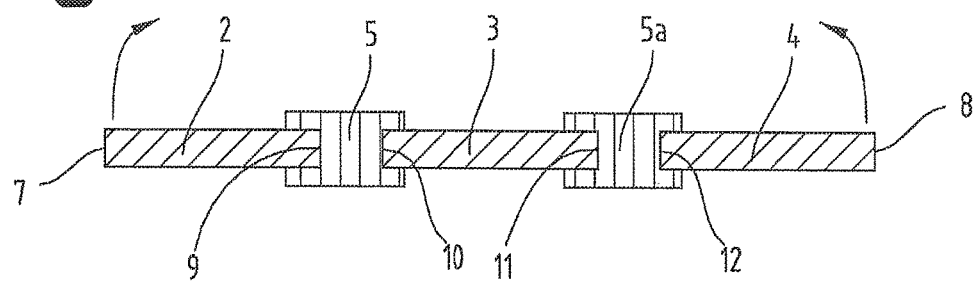

The invention and other advantages will be explained with reference to a few examples of embodiments illustrated in the appended drawings, although these are not intended to be restrictive. The drawings show very schematically simplified diagrams of the following:

FIG. 1 an endless belt made from three mutually welded metal plates;

FIG. 2 a composite board comprising three metal plates;

FIG. 3 a section along line indicated in FIG. 2;

FIG. 4 a device for producing the endless belt illustrated in FIG. 1 in a first operating mode;

FIG. 5 the device illustrated in FIG. 4 in a second operating mode;

FIG. 6 a device in which an endless belt as illustrated in FIG. 1 may be used.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

As illustrated in FIG. 1, an endless belt 1 as proposed by the invention may be manufactured from three metal plates 2, 3, 4 connected to one another. Portions I, II, III are formed by the metal plates 2, 3, 4 disposed one after the other in the belt longitudinal direction. Two directly adjacent portions I, II, III are welded together respectively at mutually adjoining edges of the portions I, II, III. In this respect, the weld seam may extend transversely to or at an angle to the belt longitudinal direction. The endless belt 1 is preferably what is referred to as a small belt. For example, the endless belt 1 may have a circumferential length of between 0.2 m and 10 m, in particular between 1 m and 3 m, a thickness of between 0.1 mm and 1 mm, in particular between 0.2 mm and 0.8 mm and a width of between 0.2 m and 4 m, in particular between 2 m and 3 m.

Based on a preferred embodiment of the invention, the endless belt 1 may also be manufactured from a steel comprising 0.09% C, 15.0% Cr, 7.0% Ni, 0.7% Cu and 0.4% Ti, the remaining elements of the steel preferably being provided in the form of Fe. The endless belt 1 may also have a tensile strength of 1200 to 1600 N/mm$^2$ and a modulus of elasticity of 190000 to 210000 N/mm$^2$.

In order to produce the endless belt 1 illustrated in FIG. 1, two adjacent metal plates 2, 3, 4 may be connected to one another respectively, each with a connection element 5, 5a, to obtain a composite board 6 made from the three metal plates 2, 3, 4, in a first step as illustrated in FIG. 2.

To this end, as illustrated in FIG. 3, two metal plates 2, 3, 4 are introduced into one of two opposing fixtures of the respective connection element 5, 5a, with one edge 9, 10, 11, 12 of each leading. As illustrated in FIG. 3 by way of example, the connection elements 5, 5a may have an H-shaped cross-section. Alternatively, however, another option would be for the connection elements 5, 5a to be provided in the form of collars extending round the end regions of the metal plates 2, 3, 4 without an inner wall separating the edges 9, 10, 11, 12. Furthermore, the connection elements 5, 5a need not extend across the entire width of the metal plates in the manner illustrated here. For example, it would also be possible for the length of the connection elements 5, 5a to be shorter than the length of the edges 9, 10, 11, 12. In the latter case, rather than just one connection element 5, 5a between two metal plates 2, 3, 4, it would also be possible to provide several connection elements 5, 5a along the edges 9, 10, 11, 12. The connection elements 5, 5a may also be provided with fixing mechanisms, such as screws or clamps for example, to prevent any slipping.

Having formed the composite board 6, free end edges 7, 8 of the composite board 6 lying opposite the edges 9, 10, 11, 12 of the metal plates 2, 3, 4 disposed in the at least one connection element 5, 5a are bent towards one another and welded together. As far as the welding is concerned, various welding methods may be used, for example laser welding, WIG welding, plasma welding, MIG-MAG welding, etc.

The process of bending the composite board 6 and welding the free end edges 7, 8 together preferably takes place using a device 13 such as that illustrated in FIGS. 4 and 5. Based on one variant of the invention, the device 13 may be of the type mentioned above in connection with EP 0 701 878 A1, having a holding device 14 with tensioning belts 15. The tensioning belts 15 are disposed one after the other as viewed in the direction of FIGS. 4 and 5 so that only the first of the tensioning belts 15 is visible in the drawings. The holding device 14 may have displaceable side panels 16 and 17, the mutual spacing of which can be varied. The side panels 16 and 17 act as a holding means for the tensioning belts 15. The tensioning belts 15 can be guided by means of pulleys 18, 19 disposed on the side panels 16 and 17. The free ends of the tensioning belts 15 may be wound on reels 20, 21 which can be connected to controlled drives in order to adjust the length and lateral positioning of the tensioning belts 15. The holding device 14, which may be disposed on a tool carriage that can be moved out of the device 13, may be moved outside of the device 13 in order to place the composite board 6 on it. The holding device 13 is loaded by placing the composite board 6 on the tensioning belts 5, for which purpose the side panels 16 and 17 are moved apart from one another. The tensioning belts 15 may be tensed to a set position for the respective belt diameter. As the side panels 16 and 17 are moved towards one another, the composite board 6 is formed to an annular shape and the free ends of the composite board 6 can be clamped in a clamping device 22. The clamping device 22 may comprise a support 23, for example in the form of a bar or tube, as well as two separately operable clamping jaws 24, 25. Once the composite board 6 has been formed to an annular shape and the end edges 7, 8 have been clamped in the clamping device 22, a gap between the free end edges 7, 8 can be closed by increasing the tensioning force on one side of the tensioning belts 15. Once the end edges 7, 8 have been pushed together, the clamping force of the clamping device 22 can be increased and the position of the end edges 7, 8 fixed so that the end edges 7, 8 are no longer able to slip. In the device 13, the composite board 6 can then be welded along the end edges 7, 8 that have been bent towards one another by means of a welding device 26.

When the end edges 7, 8 have been welded, the holding device 14 can be moved out of the device 13 and the now ring-shaped composite board 6 can be removed. The connection element 5 is then removed and the composite board 6 placed back in the holding device 14 and the edges 9, 10 that were connected to one another beforehand by the connection element 5 are bent towards the end edges 7, 8 in the manner described above and welded together. When the edges 9, 10 have been welded, the entire process of unloading and loading the holding device 14 can be repeated, in which case the connection element 5*a* is now removed and the edges 11, 12 that were connected to one another beforehand by the second connection element 5*a* in the manner described above are finally bent towards one another and welded together to form the endless belt 1.

At this stage, it should also be mentioned that the process of producing the endless belt 1 from the composite board 6 by means of the device 13 may be preceded or followed by other processing steps, such as orientation, processing the edges of the metal plates 2, 3, 4, polishing.

By way of example, FIG. 6 illustrates a device 27 for facing corrugated board. The device 27 has an endless belt 1 of the type illustrated in FIG. 1. The endless belt 1 runs across two rollers or drums 28, 29. One of the rollers 28, 29 may be a tension roller, for example, and the other a pulley roll. The device 27 may also have a top fluted roller 30 and a bottom fluted roller 31 which mesh with one another. An adhesive may be applied to a first paper web 32 by means of a glue applicator roll 33 and a second paper web 34 is pressed onto the adhesive layer by the endless belt 1, which in this instance is used as a pressing belt.

Although not illustrated, the endless belt 1 may be used in other devices, such as drive devices for automobile test rigs, for example.

The embodiments illustrated as examples represent possible variants of the device proposed by the invention and the method proposed by the invention and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated and falling within the meaning of the independent claims are possible and fall within the scope of the invention.

LIST OF REFERENCE NUMBERS

1 Endless belt
2 Metal plate
3 Metal plate
4 Metal plate
5*a* Connection element
5 Connection element
6 Composite board
7 End edge
8 End edge
9 Edge
10 Edge
11 Edge
12 Edge
13 Device
14 Holding device
15 Tensioning belt
16 Side panel
17 Side panel
18 Pulley
19 Pulley
20 Reel
21 Reel
22 Clamping device
23 Support
24 Clamping jaws
25 Clamping jaws
26 Welding device
27 Device
28 Roller
29 Roller
30 Fluted roller
31 Fluted roller
32 Paper web
33 Glue applicator roll
34 Paper web

The invention claimed is:

1. Method of producing an endless belt (1) from at least two metal plates (2, 3, 4), wherein the at least two metal plates (2, 3, 4) are introduced into at least one removable connection element (5, 5*a*), one edge (9, 10, 11, 12) of each leading, and form a composite board (6), whereupon free end edges (7, 8) of the composite board (6) which lie opposite the edges (9, 10, 11, 12) of the metal plates arranged in the at least one connection element (5) are bent towards one another and welded together, whereupon the at least one connection element (5, 5*a*) is removed and the edges (9, 10, 11, 12) of the metal plates (2, 3, 4) connected to one another beforehand by the at least one connection element (5) are bent towards one another and welded together, wherein three metal plates (2, 3, 4) are used to produce the belt (1) and two respectively adjacent metal plates (2, 3, 4) are connected to one another, each by at least one connection element (5, 5*a*), to form a composite board (6) from the three metal plates (2, 3, 4), the terminal, free end edges (7, 8) of which are then bent towards one another and welded together, whereupon at least a first connection element (5) disposed between a middle metal plate (3) and a first outer metal plate (2) is removed and the edges (9, 10) of the middle metal plate (3) and the first outer metal plate (2) connected to one another beforehand by the at least one first connection element (5) are bent towards one another and welded together, whereupon at least a second connection element (5*a*) disposed between the middle metal plate (3) and a second outer metal plate (4) is removed and edges (11, 12) of the middle and the second outer metal plates connected to one another beforehand by the at least one second connection element (5*a*) are bent towards one another and welded together.

2. Method according to claim 1, wherein the metal plates (2, 3,4) connected to one another to form the composite board (6) are formed to an annular shape in a holding device (14) by means of tensioning belts (15), and the free end edges (7, 8) of the composite board (6) are clamped in a clamping device (22) and moved towards one another until a gap between the free end edges (7, 8) is closed, whereupon the free end edges (7, 8) are welded together by means of a welding device (26).

3. Method according to claim 2, wherein the metal plates (2, 3, 4) are connected to one another by means of the at least one connection element (5, 5*a*) before being introduced into the holding device (14).

* * * * *